(12) United States Patent
Nickels et al.

(10) Patent No.: US 7,905,469 B2
(45) Date of Patent: Mar. 15, 2011

(54) GASEOUS FUEL MIXING DEVICE

(75) Inventors: Travis J. Nickels, Milwaukee, WI (US); Jimmy L. Meronek, Burlington, WI (US)

(73) Assignee: Briggs and Statton Corporation, Wauwatosa, WI (US)

( * ) Notice: Subject to any disclaimer, the term of this patent is extended or adjusted under 35 U.S.C. 154(b) by 376 days.

(21) Appl. No.: 12/118,833

(22) Filed: May 12, 2008

(65) Prior Publication Data

US 2008/0290531 A1 Nov. 27, 2008

Related U.S. Application Data

(60) Provisional application No. 60/931,843, filed on May 25, 2007.

(51) Int. Cl.
*F02M 21/04* (2006.01)
(52) U.S. Cl. ......... 261/16; 123/527; 261/23.2; 261/23.3; 261/52; 261/DIG. 74
(58) Field of Classification Search .......... 123/527–529; 261/16, 23.2, 23.3, 52, DIG. 74
See application file for complete search history.

(56) References Cited

U.S. PATENT DOCUMENTS

| | | |
|---|---|---|
| 871,134 A | 11/1907 | Monnier et al. |
| 1,383,994 A | 7/1921 | Olson |
| 1,808,587 A | 6/1931 | Adams |
| 1,885,331 A | 11/1932 | Collins |
| 2,725,865 A | 12/1955 | McDuffie |
| 2,737,170 A | 3/1956 | McDuffie |
| 3,089,685 A | 5/1963 | Hennemann et al. |
| 3,843,338 A * | 10/1974 | Zonker et al. ................ 48/180.1 |
| 3,948,226 A | 4/1976 | Green et al. |
| 3,970,059 A | 7/1976 | Pisar |
| 4,158,280 A | 6/1979 | Thomas et al. |
| 4,216,744 A | 8/1980 | Oswald et al. |
| 4,235,828 A | 11/1980 | Howes |
| 4,327,553 A | 5/1982 | Rilett |
| 4,351,300 A | 9/1982 | Selvidge et al. |
| 4,386,594 A | 6/1983 | Szloboda |
| 4,398,521 A | 8/1983 | Schuurman |

(Continued)

FOREIGN PATENT DOCUMENTS

EP 1383994 8/2007

(Continued)

OTHER PUBLICATIONS

Beam LP-Gas Products Carburetion Product Catalogue, Available at least as early as Nov. 1988, 146 pages.

(Continued)

*Primary Examiner* — Richard L Chiesa
(74) *Attorney, Agent, or Firm* — Michael Best & Friedrich LLP

(57) ABSTRACT

A gaseous fuel mixing device includes a body having an air/fuel passageway and a gaseous fuel passageway in fluid communication with the air/fuel passageway, a throttle valve pivotably coupled to the body and positioned in the air/fuel passageway, and an intake unit coupled to the body. The intake unit includes an inlet configured to be fluidly connected with a source of gaseous fuel, a first jet fluidly communicating the inlet and the gaseous fuel passageway, a second jet selectively fluidly communicating the inlet and the gaseous fuel passageway, and a selector valve operable to control a flow of gaseous fuel through the second jet.

33 Claims, 16 Drawing Sheets

U.S. PATENT DOCUMENTS

| | | | |
|---|---|---|---|
| 4,413,474 A | 11/1983 | Moscrip | |
| 4,415,507 A | 11/1983 | Voliva | |
| 4,430,275 A | 2/1984 | Horton | |
| 4,492,207 A * | 1/1985 | Hallberg | 123/527 |
| 4,492,208 A | 1/1985 | Lent | |
| 4,502,435 A * | 3/1985 | Tadokoro et al. | 123/198 F |
| 4,508,189 A * | 4/1985 | Kato | 180/219 |
| 4,528,966 A | 7/1985 | Lent et al. | |
| 4,535,728 A | 8/1985 | Batchelor | |
| 4,553,519 A | 11/1985 | Masson | |
| 4,570,587 A | 2/1986 | Watanabe et al. | |
| 4,651,682 A | 3/1987 | Pefley et al. | |
| 4,688,537 A | 8/1987 | Calkins et al. | |
| 4,826,517 A | 5/1989 | Norman | |
| 4,884,530 A | 12/1989 | Boekhaus et al. | |
| 5,010,868 A | 4/1991 | Clements | |
| 5,042,238 A | 8/1991 | White, III et al. | |
| 5,069,190 A | 12/1991 | Richards | |
| 5,343,699 A | 9/1994 | McAlister | |
| 5,411,058 A | 5/1995 | Welsh et al. | |
| 5,476,082 A | 12/1995 | Carpenter et al. | |
| 5,542,398 A | 8/1996 | Marcon | |
| 5,581,986 A | 12/1996 | Calver | |
| 5,676,117 A | 10/1997 | Williams | |
| 5,678,527 A | 10/1997 | Suzuki et al. | |
| 5,775,309 A | 7/1998 | Burrahm | |
| 5,803,035 A | 9/1998 | Guntly | |
| 5,868,117 A | 2/1999 | Moote et al. | |
| 6,120,007 A | 9/2000 | Grant | |
| 6,250,261 B1 * | 6/2001 | Santarossa | 123/27 GE |
| 6,276,345 B1 * | 8/2001 | Nelson et al. | 123/525 |
| 6,481,698 B1 * | 11/2002 | Calvin et al. | 261/23.2 |
| 7,410,152 B2 * | 8/2008 | Yates | 261/23.2 |
| 7,591,257 B2 * | 9/2009 | Bayer et al. | 123/575 |
| 2006/0236986 A1 * | 10/2006 | Fujisawa et al. | 123/527 |
| 2007/0074452 A1 * | 4/2007 | Yates | 48/144 |
| 2008/0060626 A1 | 3/2008 | Bayer et al. | |

FOREIGN PATENT DOCUMENTS

| | | | |
|---|---|---|---|
| EP | 1808587 | 10/2007 | |
| GB | 1315867 | 5/1973 | |
| GB | 2012356 | 7/1979 | |
| JP | 57-203851 | 12/1982 | |
| JP | 60-176820 | 9/1985 | |
| JP | 3-279659 A * | 12/1991 | 123/527 |
| JP | 6-193512 | 7/1994 | |
| WO | 02073015 | 9/2002 | |

OTHER PUBLICATIONS

Beam Products Mfg. Co. LP-Gas Conversions Product Brochure, Mar. 1985, 2 pages.

Lady, Paul, "Don't Overlook the Small Engine Market," Gas Industries, The Magazine of LP-Gas Distribution, Nov. 1974, 4 pages.

Osenga, Mike, "Honda adds first dual-fuel engines," Diesel Progress North American Edition, May 2003, 2 pages.

WINCO Product Brochure, "Home Power Tri-Fuel Portable Generator," Oct. 2002, 2 pages.

* cited by examiner

GASEOUS FUEL MIXING DEVICE

RELATED APPLICATIONS

This application claims priority to U.S. Provisional Patent Application Ser. No. 60/931,843 filed on May 25, 2007, the entire content of which is incorporated herein by reference.

BACKGROUND

The present invention relates to a mixing device for gaseous fuel. More particularly, the present invention relates to a gaseous fuel mixing device using a modified carburetor body.

Typically, a liquid fuel carburetor includes at least one air intake passageway having a venturi and a fuel bowl that is configured to temporarily store a supply of liquid fuel. The venturi is in communication with the fuel bowl such that, as air flows through the venturi, liquid fuel is drawn from the fuel bowl and into the intake passageway. The fuel mixes with the air to become a vapor and flows through the intake passageway or throat to a cylinder of an internal combustion engine. The vaporized fuel is combusted in the cylinder to drive the engine.

Due to governmental regulations on emissions from small engines, it has become more desirable to power internal combustion engines with gaseous fuels (e.g., liquid propane and natural gas). However, these engines do not require typical carburetors that are configured to deliver vaporized gasoline to the cylinder. Rather, these engines require mixing devices that are capable of mixing the fuel with air, and supplying the mixture to the engine.

SUMMARY

The present invention provides, in one aspect, a mixing device for use with a gaseous fuel internal combustion engine. To reduce cost, the mixing device uses a modified, existing carburetor body and a gaseous fuel reservoir or intake unit. The modified carburetor body includes an air intake passageway, a throttle valve coupled for rotation in the intake passageway, and at least one passageway in communication between the intake unit and the intake passageway. The intake unit includes a fuel chamber, a first jet, and an optional second jet. The intake unit may also include a valve operable to selectively close the second jet for different gaseous fuels. In other embodiments, the mixing device may have one or two jets, or could be designed for use with a single fuel (LP or NG) and thus would not require a selector valve.

The present invention provides, in another aspect, a gaseous fuel mixing device including a body including an air/fuel passageway and a gaseous fuel passageway in fluid communication with the air/fuel passageway, a throttle valve pivotably coupled to the body and positioned in the air/fuel passageway, and an intake unit coupled to the body. The intake unit includes an inlet configured to be fluidly connected with a source of gaseous fuel, a first jet fluidly communicating the inlet and the gaseous fuel passageway, a second jet selectively fluidly communicating the inlet and the gaseous fuel passageway, and a selector valve operable to control a flow of gaseous fuel through the second jet.

The present invention provides, in yet another aspect, a gaseous fuel mixing device including a body having a first air/fuel passageway, a second air/fuel passageway, a first gaseous fuel passageway in fluid communication with the first air/fuel passageway, a second gaseous fuel passageway in fluid communication with the second air/fuel passageway, a first throttle valve pivotably coupled to the body and positioned in the first air/fuel passageway, a second throttle valve pivotably coupled to the body and positioned in the second air/fuel passageway, and an intake unit coupled to the body and in fluid communication with a source of gaseous fuel. Each of the first and second gaseous fuel passageways is configured to draw an amount of gaseous fuel, based upon individual demand of fuel through the respective first and second air/fuel passageways, from the intake unit.

The present invention provides, in a further aspect, a gaseous fuel mixing device including a modified carburetor body, originally configured for use with a liquid fuel, having an air/fuel passageway, a gaseous fuel passageway having an inlet in communication with an exterior of the body and an outlet in communication with the air/fuel passageway, a closed liquid fuel passageway, a throttle valve pivotably coupled to the carburetor body and positioned in the air/fuel passageway, and an intake unit coupled to the carburetor body. The intake unit is configured to deliver gaseous fuel to the gaseous fuel passageway in the carburetor body.

The present invention provides, in another aspect, a method of converting a carburetor from operating using a liquid fuel to operating using a gaseous fuel. The method includes providing a carburetor body including an air/fuel passageway, creating a gaseous fuel passageway through a portion of the body to fluidly communicate the gaseous fuel passageway with the air/fuel passageway, and closing a liquid fuel passageway in the body.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
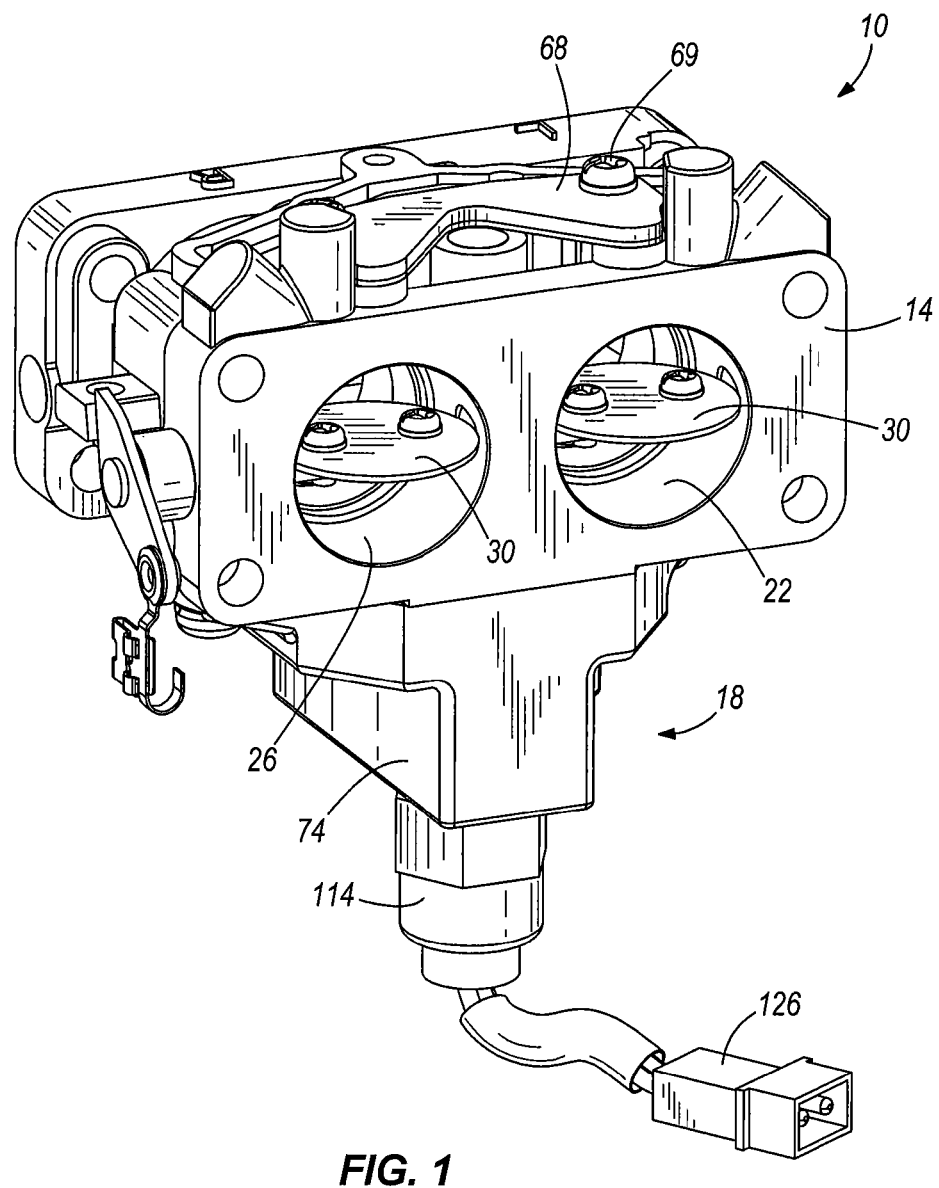
FIG. 1 is a front perspective view of a gaseous fuel mixing device including a modified carburetor body and an intake unit.
Figure 2:
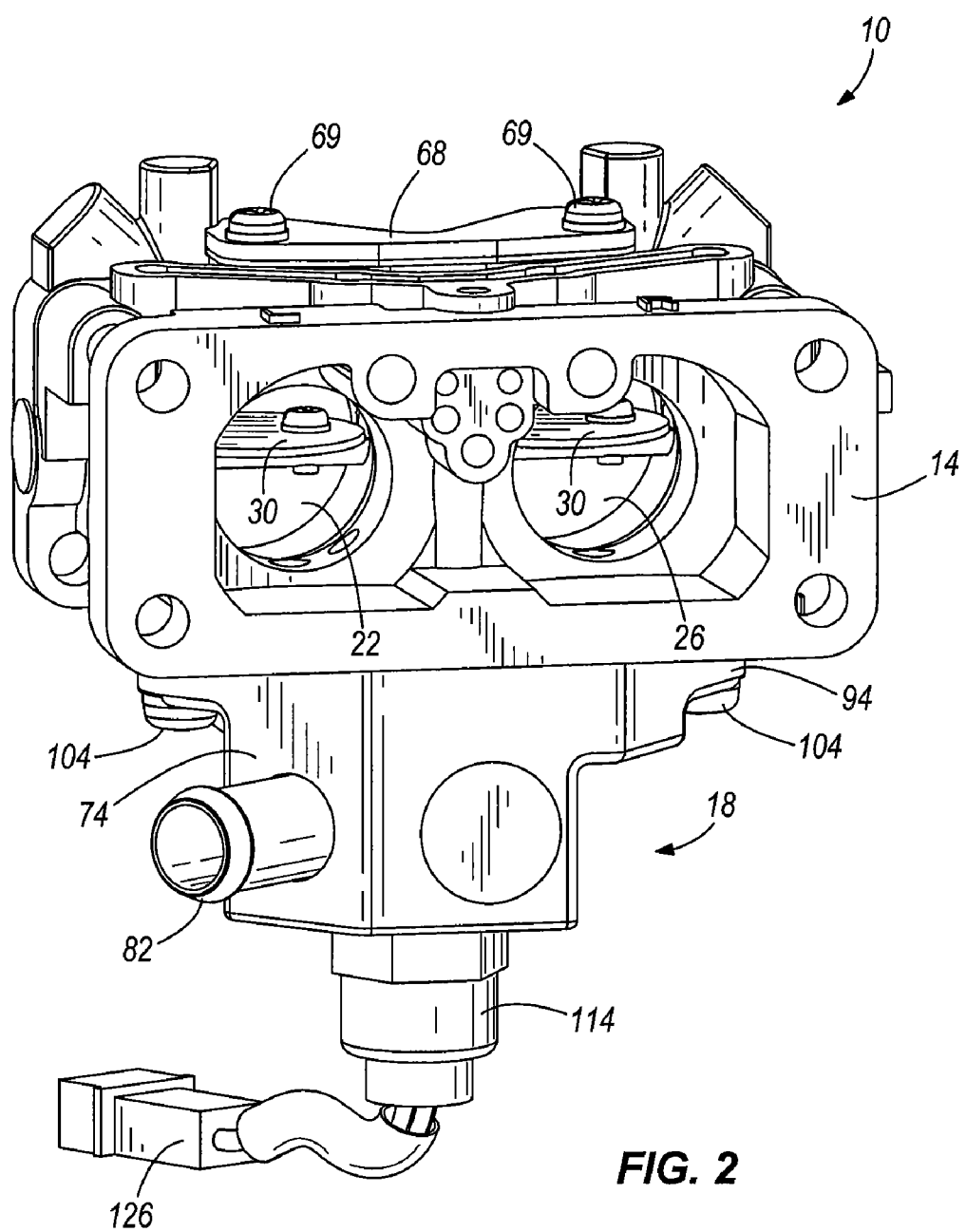
FIG. 2 is a rear perspective view of the gaseous fuel mixing device of FIG. 1.
Figure 3:
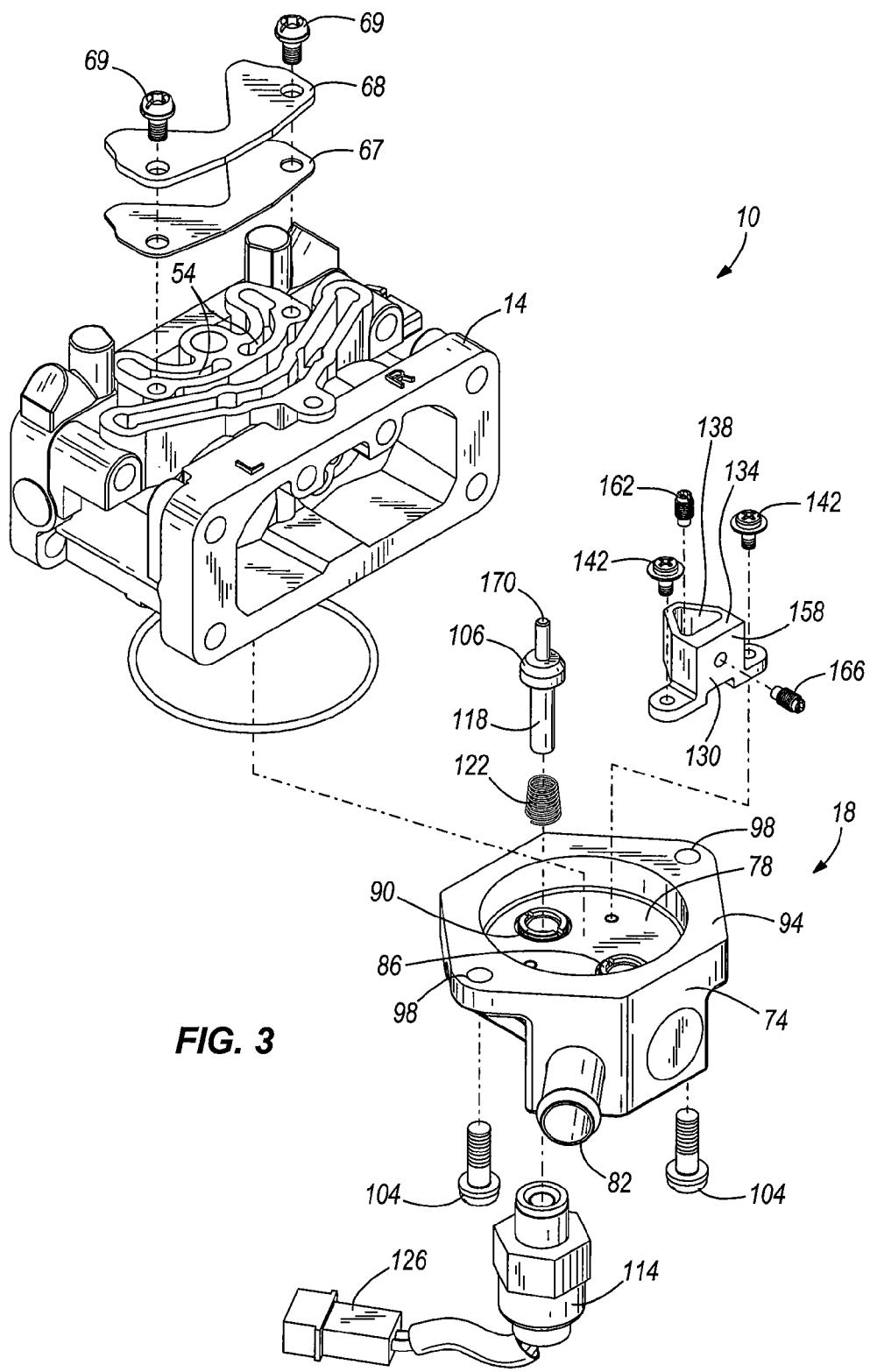
FIG. 3 is an exploded perspective view of the gaseous fuel mixing device of FIG. 1.
Figure 16:
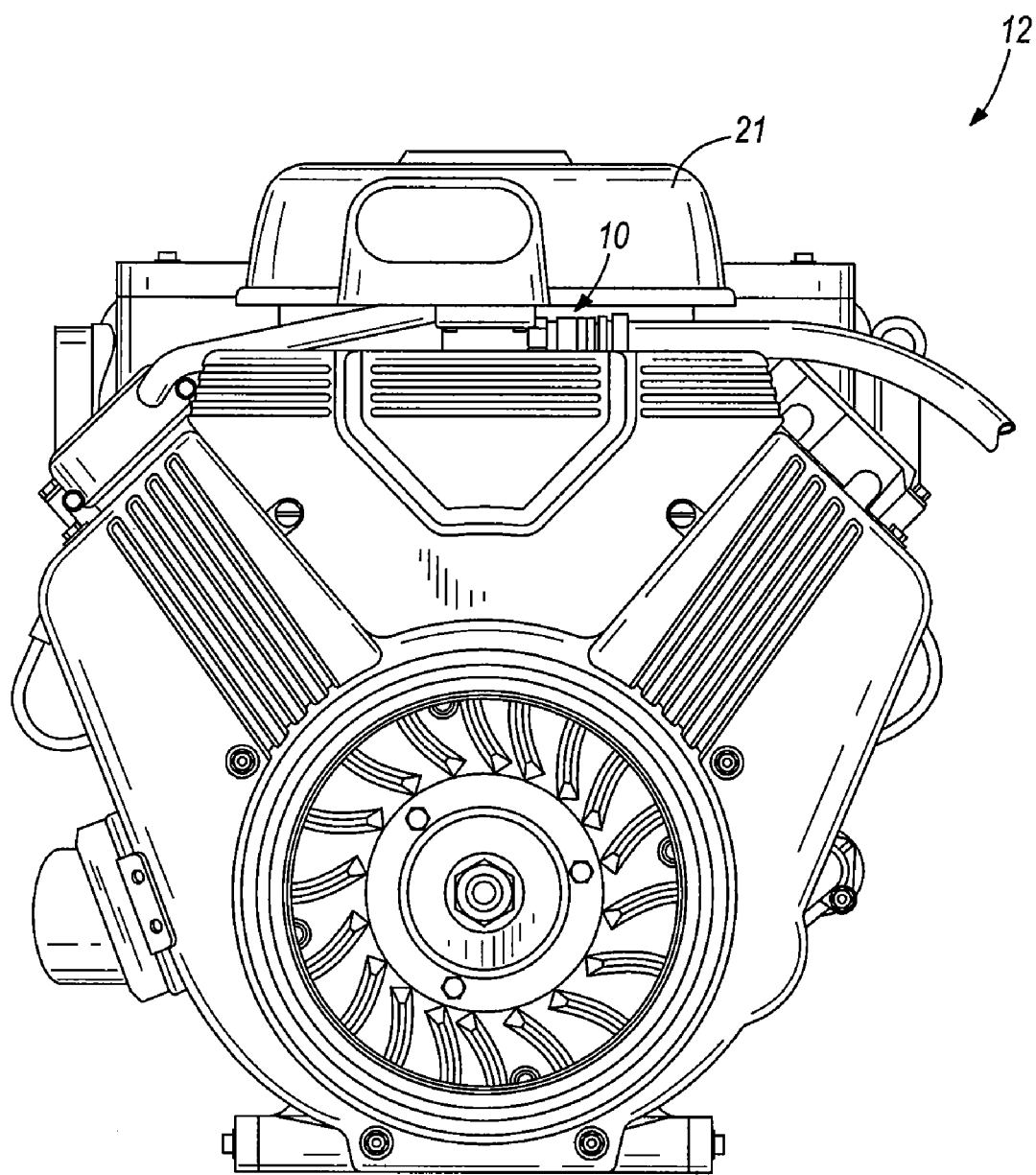
FIG. 16 is a front view of an engine incorporating the gaseous fuel mixing device of FIG. 1.

FIGS. 1-3 illustrate a mixing device 10 that includes a modified carburetor body 14 and a reservoir or intake unit 18. In the illustrated embodiment, the mixing device 10 is configured for use with a two-cylinder, horizontal shaft engine 12, and may be disposed beneath a removable cover 21 of the engine 12 (see FIG. 16). Alternatively, the mixing device 10 may be utilized with a vertical shaft engine. The engine 12 is powered by a gaseous fuel such as, for example, liquid propane (LP) or natural gas (NG). In some embodiments, the gaseous fuel engine 12 may be used in a standby generator. In other embodiments, the gaseous fuel engine 12 may be used in other suitable gaseous fuel applications, such as a lawnmower. Additionally, the mixing device 10 may be configured for use with a different number of cylinders, such as a single cylinder engine.

In some embodiments, a first regulator (not shown) may be positioned upstream of the mixing device 10 to regulate the pressure of the gaseous fuel entering the mixing device 10. In one embodiment, the first regulator may be positioned near an LP tank or a NG source to reduce the relatively high pressure of the gaseous fuel prior to the gaseous fuel flowing into the intake unit 18. For example, the first regulator may be configured to facilitate altering the fuel from a high-pressure liquid state to a lower-pressure gaseous state. Additionally or alternatively, a second regulator (not shown) may be positioned on or adjacent the engine 12 to reduce the pressure of the gaseous fuel as it enters the mixing device 10.

As shown in FIGS. 1-3, the carburetor body 14 is from an existing V-twin carburetor, originally configured for use with a liquid fuel (e.g., gasoline), that is modified for use with a gaseous fuel. For example, the carburetor body 14 may be modified by closing off (e.g., blocking, plugging, etc.) unneeded passageways, removing a fuel bowl and float (not shown), and adding an input/chamber component (e.g., the intake unit 18) in place of the fuel bowl for use with the gaseous fuel mixing device 10.

With reference to FIG. 1, the carburetor body 14 includes a first air/fuel or intake passageway 22, a second air/fuel or intake passageway 26, and respective throttle plates or valves 30 pivotably coupled for rotation in the intake passageways 22, 26. The intake passageways 22, 26 are in communication with an external air source and the intake unit 18 to provide the gaseous fuel to corresponding cylinders of the engine 12. The throttle valves 30 are responsive to actuation by an engine governor or are manually actuated by a user, and rotate between an opened and a closed position to adjust the amount of gaseous fuel supplied to the engine 12 in accordance with the engine speed or the applied load.

In the illustrated embodiment, the gaseous fuel is drawn into the intake passageways 22, 26 by a vacuum pulse generated as air flows through a venturi 32 (i.e., the smaller diameter portion) of the intake passageways 22, 26 (see FIGS. 12-15). When the engine 12 requires more fuel, the throttle valves 30 rotate toward an open position to allow more air to flow through the intake passageways 22, 26, creating a larger vacuum pulse and drawing more fuel into the intake passageways 22, 26. When the engine 12 requires less fuel, the throttle valves 30 rotate toward a closed position to restrict the air flow through the intake passageways 22, 26, creating a smaller vacuum pulse and drawing less fuel into the intake passageways 22, 26.

The original, unmodified carburetor body also includes various passageways for air and/or fuel flow. In the illustrated embodiment, some of the passageways have been blocked off or plugged such that the carburetor body 14 is suitably modified for use with a gaseous fuel. In the figures, passageways that have been blocked are generally indicated by an "X". The passageways and holes may be plugged with epoxy or plugs, by removing corresponding core pins in the die used to form the original carburetor body, or by eliminating a machining process for the carburetor body.

Figure 6:
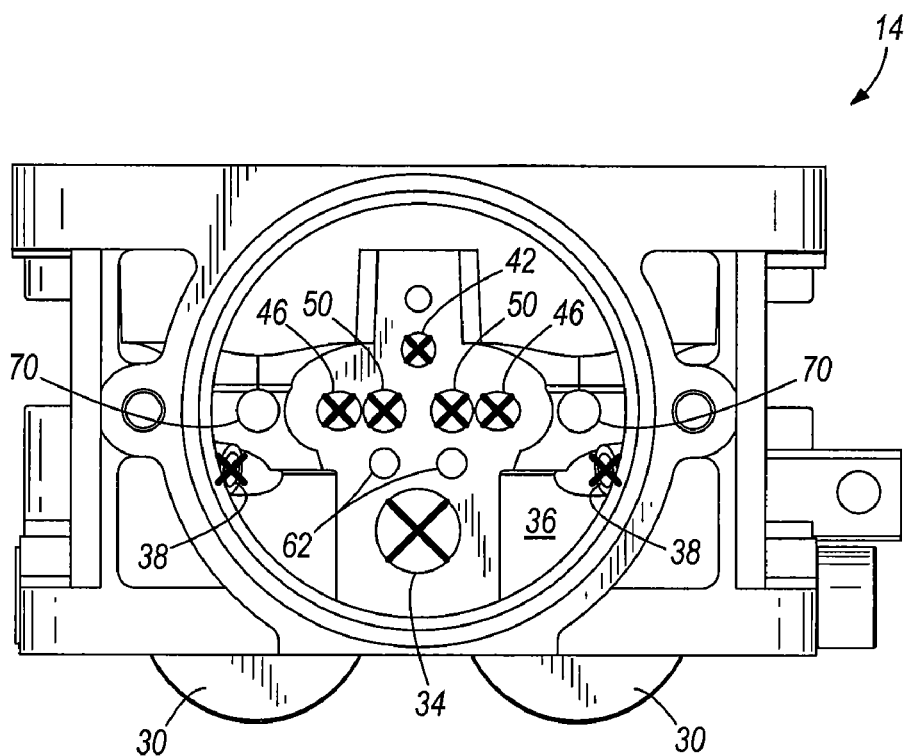
FIG. 6 is bottom view of the gaseous fuel mixing device of FIG. 1, with the intake unit removed.

Prior to modification, the carburetor body includes a main liquid (e.g., gasoline) fuel passageway or inlet 34 exposed to an exterior surface 36 of the carburetor body 14, and internal vents 38 (see FIG. 6). The main gasoline fuel inlet 34 supplies gasoline to the fuel bowl in a gasoline engine. The main gasoline fuel inlet 34 is initially defined by a core pin in the die for the carburetor body and then machined (e.g., drilled) once the carburetor body is removed from the die. In the illustrated embodiment, the main gasoline fuel inlet 34 is plugged (e.g., by using an epoxy, etc.) because the gaseous fuel engine does not require gasoline for operation.

The internal vents 38 vent the airspace above the liquid fuel in the original carburetor fuel bowl. The internal vents 38 are formed such that one end (FIG. 4) is downstream of an air cleaner/filter and the other end (FIG. 6) is in the airspace above the fuel in the fuel bowl. In some embodiments, the original carburetor body also includes a provision 42 for an additional or alternative internal vent. The provision 42 may be completely drilled through for use in lieu of the internal vents 38. However, in the illustrated embodiment, no fuel bowl is present and thus the internal vents 38 are not needed.

Therefore, both the existing internal vents 38 and the provision 42 for an internal vent are blocked off in the modified carburetor body 14.

In addition, prior to modification, the carburetor body includes nozzles extending into the first and second intake passageways 22, 26 and emulsion tubes extending into the fuel bowl. In an unmodified carburetor, the nozzles are positioned within corresponding nozzle passageways 46 and are typically made of brass. The nozzles carry fuel between the fuel bowl and the intake passageways 22, 26 to supply the fuel during operation of the engine. In the illustrated embodiment of the modified carburetor body 14, the nozzles are removed and the nozzle passageways 46 are plugged. In some embodiments, the nozzle passageways 46 remain unplugged, but are recalibrated (e.g., resized) for use with gaseous fuels.

Figure 4:
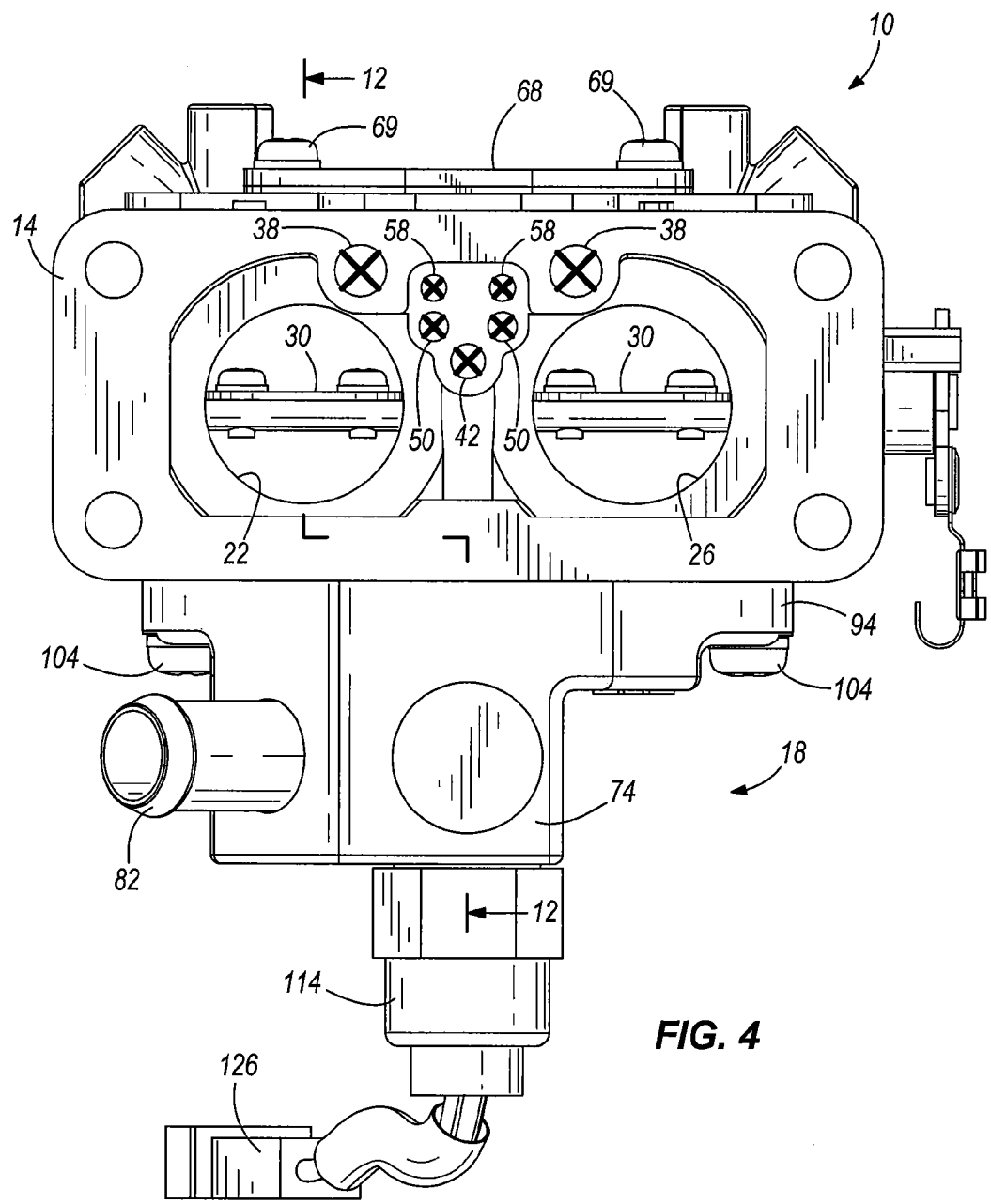
FIG. 4 is a rear view of the gaseous fuel mixing device of FIG. 1.

The emulsion tubes are made of brass and extend from corresponding emulsion passageways 50 positioned between the intake passageways 22, 26 (FIG. 4). In a standard liquid fuel carburetor, air enters the emulsion tubes and mixes with the liquid fuel. The mixture of fuel and air is then drawn through the nozzles and into the intake passageways 22, 26. In the modified carburetor body 14 used with the present invention, the emulsion tubes are removed and the emulsion passageways 50 are plugged because the fuel used with the illustrated modified carburetor body 14 is already a gas and does not require additional air to reach a gaseous state.

Figure 5:
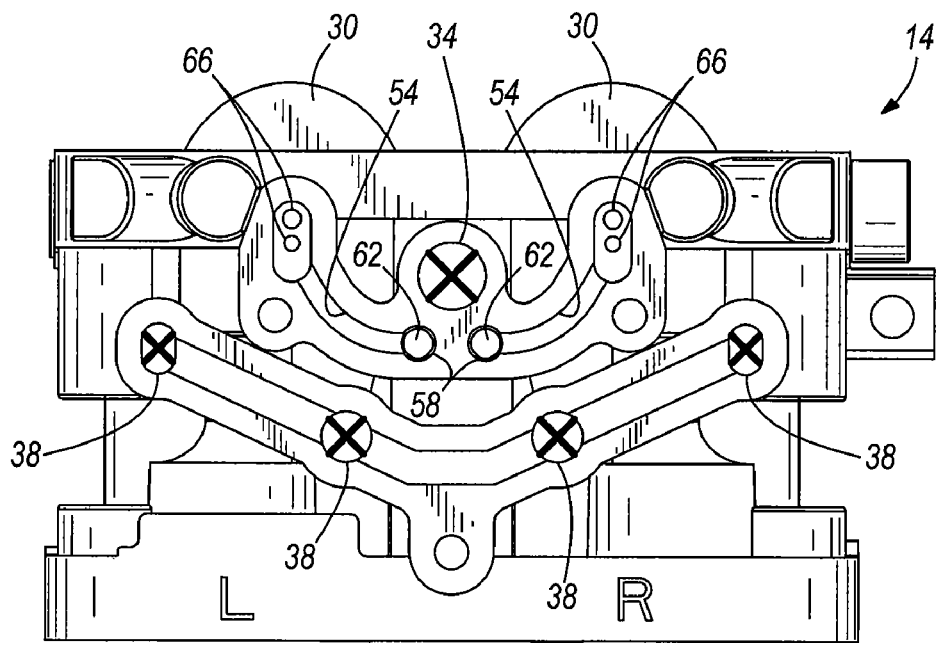
FIG. 5 is a top view of the gaseous fuel mixing device of FIG. 1, with portions removed.

As shown in FIG. 5, the original carburetor body also includes mixing chambers 54, or progression slots or holes, for use at idle speeds. The mixing chambers 54 communicate with air bleed inlets 58, fuel bleed inlets 62 (FIG. 6), and idle holes or slots 66. In a typical carburetor, the air bleed inlets 58 provide entry points for air to enter the mixing chambers 54 and break up (i.e., vaporize) fuel entering the mixing chambers 54 through the fuel bleed inlets 62. This relatively small mixture of air and fuel then enters the first and second intake passageways 22, 26 through the corresponding idle holes or slots 66 so that the engine continues to run at idle speeds. In the illustrated embodiment of the modified carburetor body 14, the fuel bleed inlets 62 are recalibrated and the air bleed inlets 58 are blocked (see FIG. 4) because the gaseous fuel does not require additional air. In addition, the idle holes 66 are recalibrated for use with the gaseous fuel. In some embodiments, the mixing chambers 54 are entirely or partially filled such that only a small, direct passageway exists between the fuel bleed inlets 62 and the idle holes 66.

As shown in FIG. 3, the mixing device 10 includes a gasket 67 and a plate 68 coupled to the carburetor body 14 to seal the gasket 67 against the carburetor body 14. Specifically, the gasket 67 and plate 68 are positioned over the mixing chambers 54 to substantially prevent entry of additional air into the mixing chambers 54. In the illustrated construction of the mixing device 10, fasteners (e.g., screws 69, etc.) are utilized to couple the plate 68 to the carburetor body 14. Alternatively, the plate 68 may be coupled to the carburetor body 14 in any of a number of different ways (e.g., by welding, brazing, by using adhesives, etc.).

Referring to FIG. 6, gaseous fuel passageways or apertures 70 are machined (e.g., drilled or bored) near an outer periphery of the carburetor body 14 during the process of modifying the carburetor body 14. The apertures 70 include respective inlets 71, each exposed to the exterior surface 36 of the carburetor body 14, and respective outlets 72 exposed to the respective intake passageways 22, 26. The apertures 70 are appropriately sized to allow gaseous fuel to flow from the intake unit 18 and into the intake passageways 22, 26. The apertures 70 replace the flow passageway previously provided by the nozzle passageways 46. As discussed above, in some embodiments, the apertures 70 may be omitted and the nozzle passageways 46 may be recalibrated for use with gaseous fuels.

As shown in FIG. 3, the intake unit 18 includes a housing 74, a gaseous fuel chamber 78 at least partially defined in the housing 74, a hose connection 82 extending from the housing 74 at least partially defining a gaseous fuel inlet 84 in the housing 74 (see FIGS. 12-15), a first jet 86 fluidly communicating the inlet 84 and the fuel chamber 78, and a second jet 90 fluidly communicating the inlet 84 and the fuel chamber 78. In the illustrated construction of the intake unit 18, each of the jets 86, 90 is a separate and distinct component from the housing 74. Specifically, each of the jets 86, 90 is generally tubular (see FIGS. 12-15) and includes an orifice 92 calibrated for use with different gaseous fuels (e.g., NG or LP). In addition, the jets 86, 90 are made from metal (e.g., brass), and are press-fit within respective apertures 93 in the housing 74. Alternatively, the jets 86, 90 may be omitted, and the respective apertures 93 in the housing 74 may be sized according to the orifices 92 in the jets 86, 90 to provide a calibrated flow of gaseous fuel from the inlet 84 to the fuel chamber 78. As a further alternative, the fuel chamber 78 may be omitted from the intake unit 18, such that gaseous fuel is delivered to the carburetor body 14 via conduits interconnecting the carburetor body 14 and the respective jets 86, 90.

As shown in FIG. 3, the intake unit 18 also includes a flange 94 having apertures 98 configured to align with corresponding apertures 102 in the carburetor body 14 (see FIG. 6). Fasteners (e.g., a screw 104, a bolt, etc.) are utilized to couple the intake unit 18 to the carburetor body 14. In the illustrated embodiment, the intake unit 18 is machined or cast from aluminum. In other embodiments, the intake unit 18 may be composed of another suitable material or combination of materials such as, for example, plastic, steel, ceramic, or the like. In the illustrated embodiment, the fuel chamber 78 is a reservoir to temporarily hold a supply of gaseous fuel.

With reference to FIG. 3, the hose connection 82 extends from the intake unit 18 and is configured to communicate with a LP supply or NG supply. In some embodiments, the hose connection 82 may include threads, barbs or a quick-connect/disconnect coupler to facilitate coupling with the gaseous fuel source. In the illustrated embodiment, the hose connection 82 is a separate piece that is threaded, welded, press-fit, brazed, or cast, or otherwise attached to the housing 74. In other embodiments, the hose connection 82 may be formed or machined as a single component with the housing 74.

With continued reference to FIG. 3, the first and second jets 86, 90 are positioned within the fuel chamber 78 to allow gaseous fuel entering the intake unit 18 through the hose connection 82 to be temporarily stored within the fuel chamber 78. In NG applications, both jets 86, 90 are configured to be open and supply NG to the fuel chamber 78. In LP applications, only one jet (e.g., the first jet 86) is configured to be open and supply LP to the fuel chamber 78. The jets 86, 90 may include different sized orifices 92, and are calibrated such that the jet 86 used to supply LP supplies the correct amount for optimal efficiency and performance.

Figure 17:
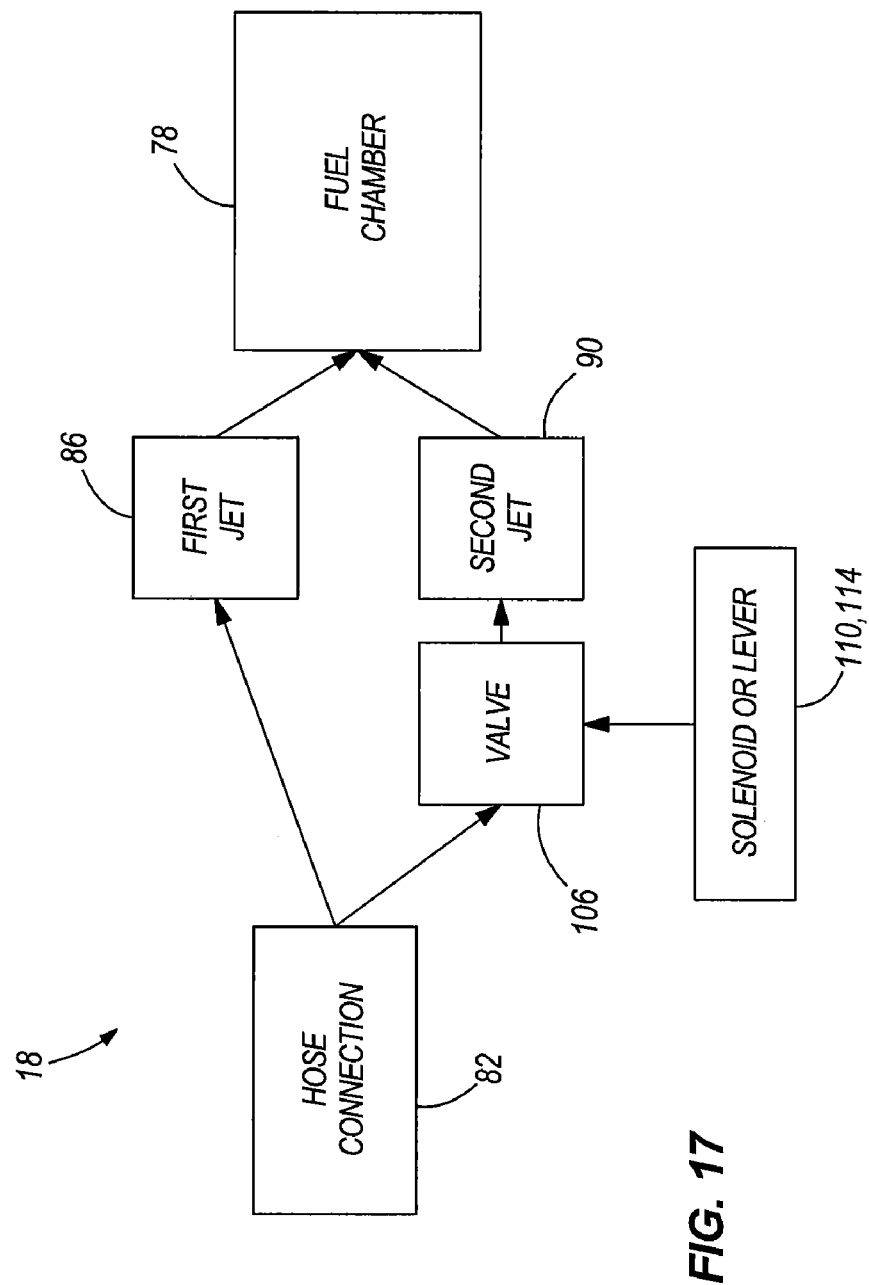
FIG. 17 is a schematic of the intake unit of FIG. 1 including a fuel selector valve.

With reference to FIG. 3, the intake unit 18 includes a selector valve 106 to selectively close one of the jets (e.g., the second jet 90). As shown schematically in FIG. 17, a solenoid or lever 110 is coupled to the valve 106 to actuate the valve 106. As such, the valve 106 may be automatically or manually operated to switch between NG and LP applications. Alternatively, the valve 106 may be set at an open or closed position during manufacture of the intake unit 18. Alternatively, one of the jets (e.g., jet 90) and the selector valve 106 could be eliminated if the mixing device 10 is designed to be used with a single type of fuel (e.g., LP).

In the illustrated construction of the intake unit 18, a solenoid 114 is utilized to move the valve 106 relative to the jet 90 to control the flow of gaseous fuel from the inlet 84 to the fuel chamber 78 via the jet 90 (see FIG. 3). The solenoid 114 includes a plunger 118 upon which the valve 106 is supported, and a biasing member (e.g., a compression spring 122) biasing the plunger 118 and valve 106 toward the jet 90. In operation of the intake unit 18, as will be discussed in greater detail below, the solenoid 114 is energized to move the plunger 118 and the valve 106 away from the jet 90, against the bias of the spring 122, to substantially open the jet 90 (see FIGS. 12 and 13). Alternatively, the solenoid 114 may be configured such that the valve 106 is biased away from the jet 90, and energizing the solenoid 114 moves the plunger 118 and the valve 106 toward the jet 90, against the bias of a tension spring, to substantially close the jet 90.

With reference to FIGS. 1-3, the solenoid 114 includes a wiring harness 126 configured to be selectively connected to a source of electricity. An individual installing, for example, a household electrical generator incorporating the engine 12, need only connect the wiring harness 126 to a battery or other source of electricity (e.g., the electricity generated by an engine alternator or the generator itself) to configure the engine 12 for operation with NG to maintain the valve 106 displaced or unseated from the jet 90. Of course, the engine 12 must also be connected to the source of NG. Likewise, the individual need only leave the wiring harness 126 unplugged to configure the engine 12 for operation with LP (in addition to connecting the engine 12 to the source of LP). As a result, the spring 122 biases the valve 106 against the jet 90 to substantially close the jet 90. Incorporating the solenoid 114 and valve 106 with the intake unit 18 allows the mixing device 10 to be packaged on the engine 12 beneath one or more shrouds or housings (e.g., cover 21; see FIG. 16), where it might otherwise be difficult to gain access to change or otherwise modify the structure of the intake unit 18 at the installation site to adapt the engine 12 to operate using either a NG fuel source or a LP fuel source.

With reference to FIG. 3, an idle jet housing 130 is positioned between the intake unit 18 and the carburetor body 14. The idle jet housing 130 includes an upper surface 134 that, when the intake unit 18 is coupled to the carburetor body 14, engages the exterior surface 36 of the carburetor body 14 to define a gaseous fuel sub-chamber 138 within the fuel chamber 78. In the illustrated construction, the idle jet housing 130 is a separate and distinct component from the intake unit 18, and is coupled to the intake unit 18 via a plurality of fasteners (e.g., screws 142, etc.). Alternatively, the idle jet housing 130 may be coupled to the intake unit 18 in any of a number of different ways (e.g., by welding, brazing, by using adhesives, etc.). As a further alternative, the idle jet housing 130 may be integrally formed as a single piece with the housing 74 of the intake unit 18.

Figure 9:
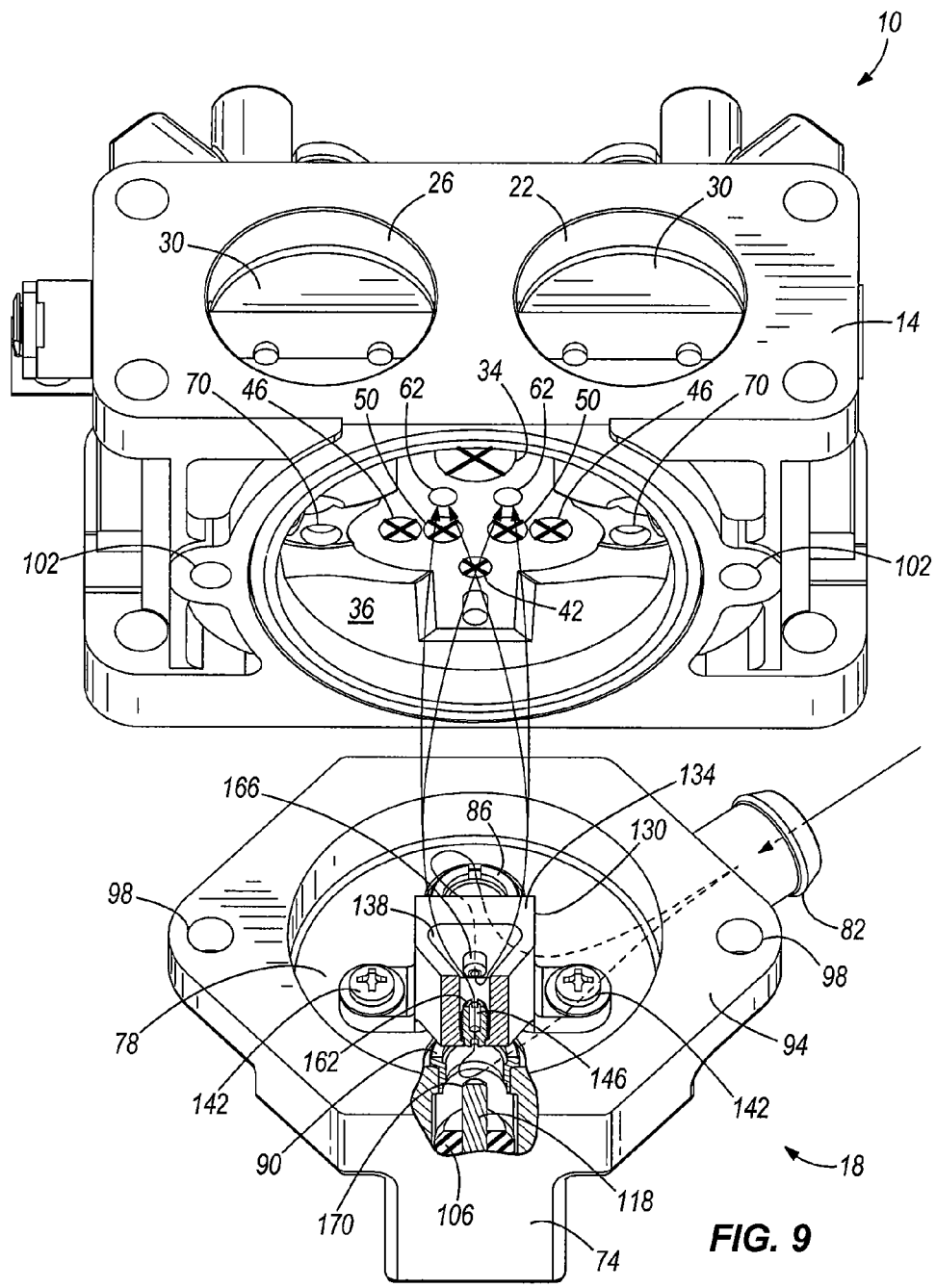
FIG. 9 is a perspective view illustrating the modified carburetor body separated from the intake unit of FIG. 1, illustrating the mixing device operating in a second condition with the first type of fuel.
Figure 10:
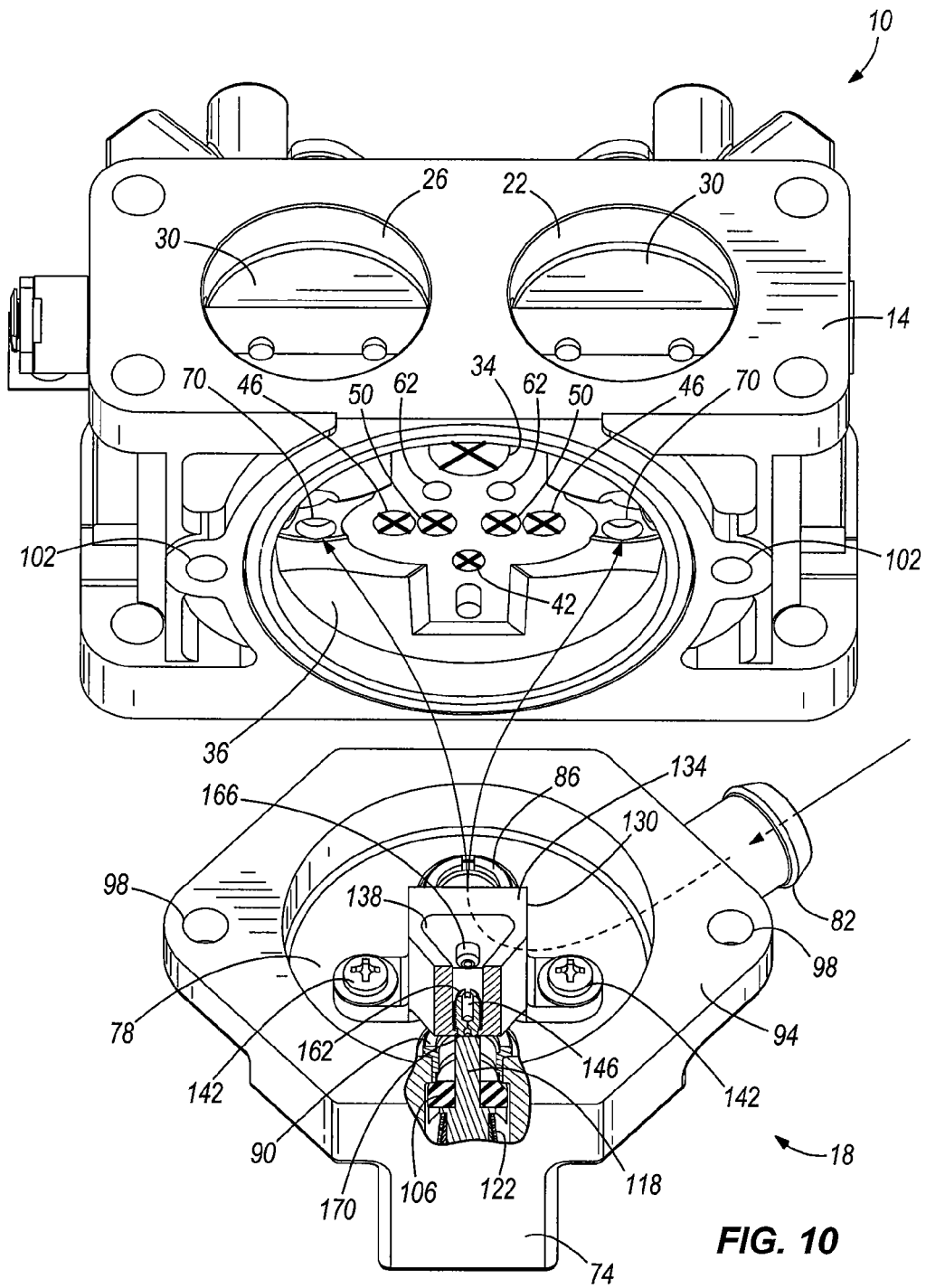
FIG. 10 is a perspective view illustrating the modified carburetor body separated from the intake unit of FIG. 1, illustrating the mixing device operating in the first condition with a second type of fuel.
Figure 11:
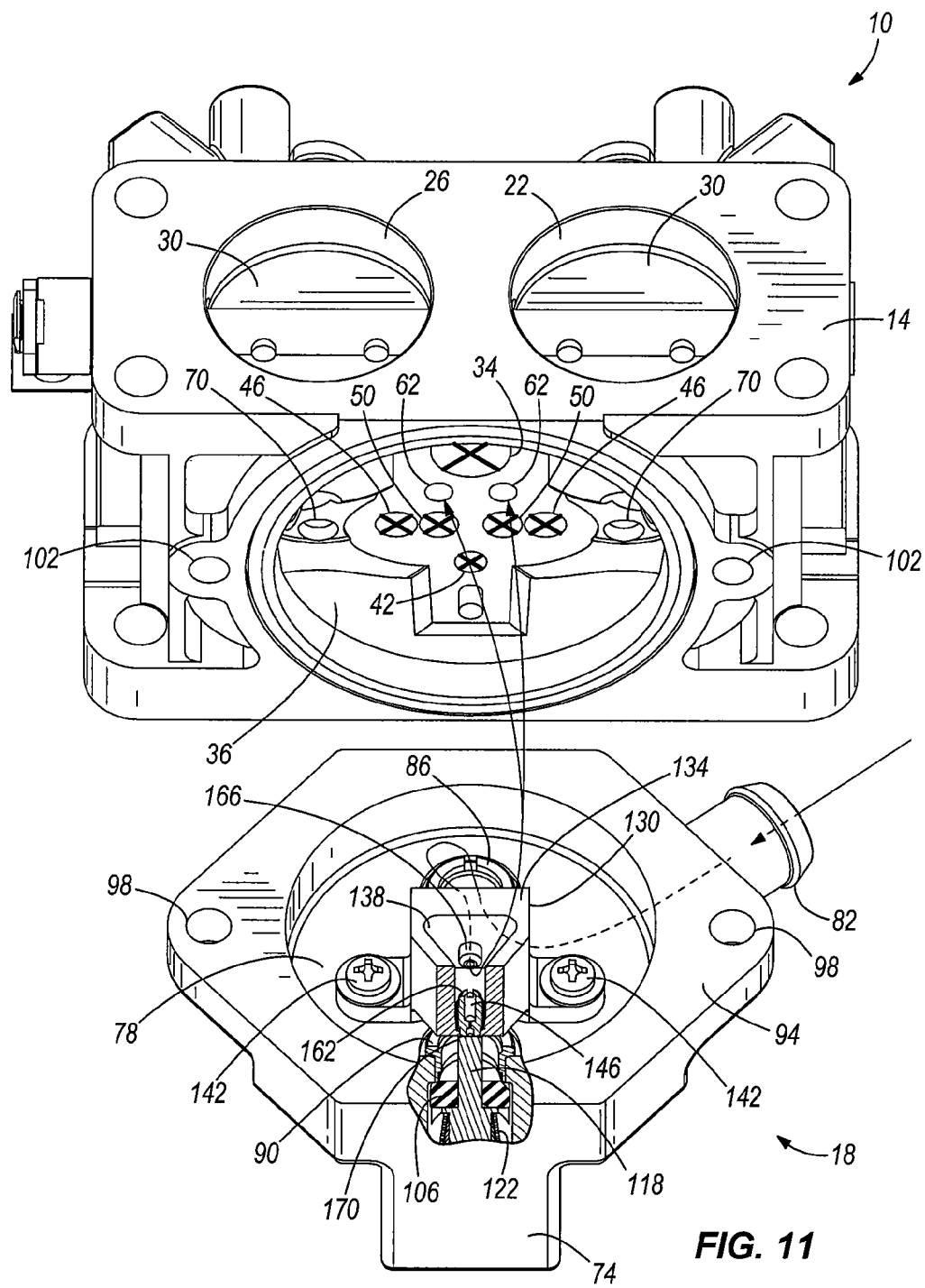
FIG. 11 is a perspective view illustrating the modified carburetor body separated from the intake unit of FIG. 1, illustrating the mixing device operating in the second condition with the second type of fuel.
Figure 13:
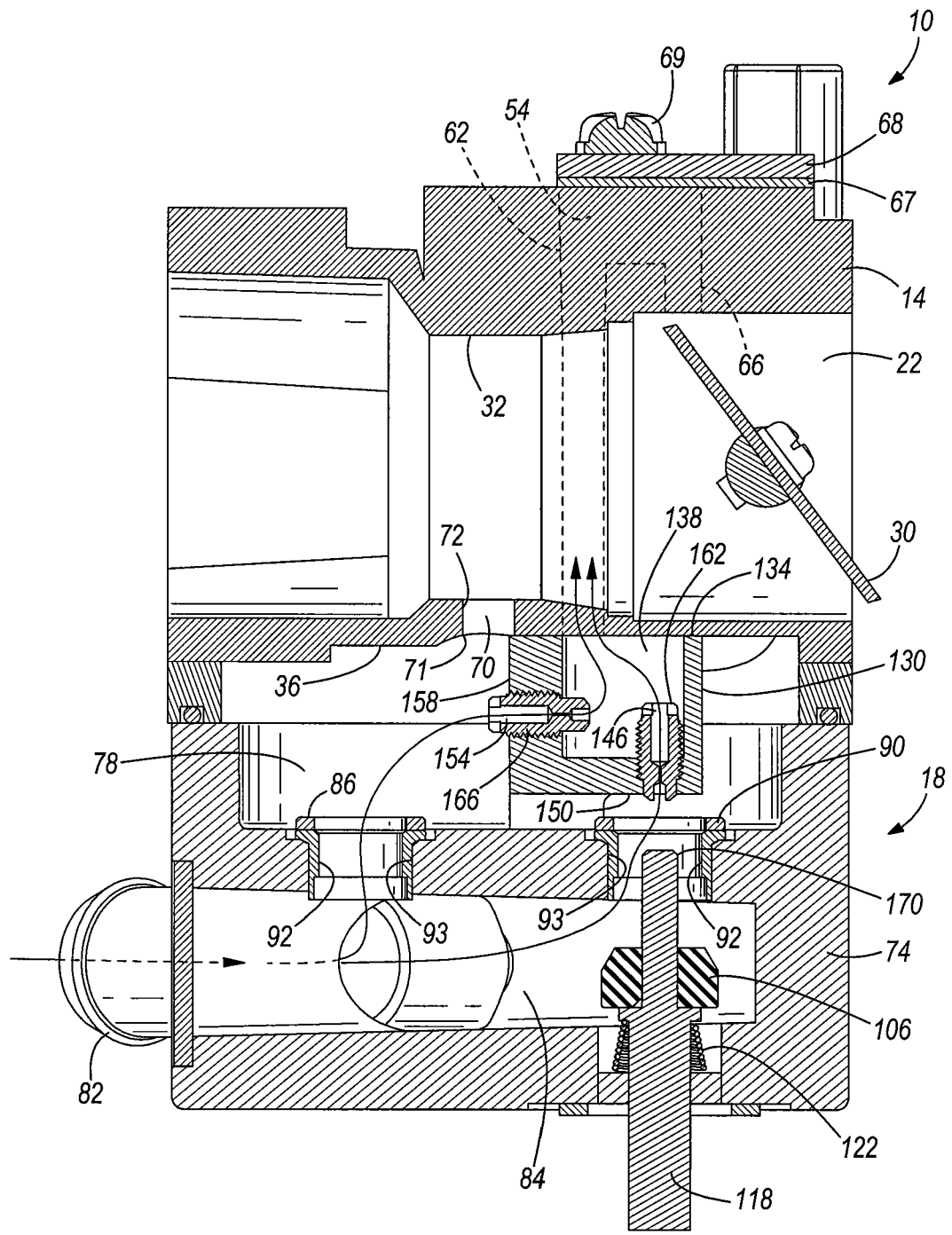
FIG. 13 is a cross-sectional view of the gaseous fuel mixing device of FIG. 1, along the same line 12-12 in FIG. 4, illustrating the mixing device operating in the second condition with the first type of fuel.

With reference to FIGS. 9 and 13, the idle jet housing 130 substantially surrounds the fuel bleed inlets 62, such that the fuel bleed inlets 62 are not directly exposed to the fuel chamber 78, but instead are directly exposed to the sub-chamber 138 in the idle jet housing 130. With continued reference to FIG. 13, the idle jet housing 130 includes an orifice 146 in a bottom surface 150 of the idle jet housing 130 in facing relationship with the jet 90, and another orifice 154 in a side surface 158 of the idle jet housing 130. As a result, gaseous fuel in the fuel chamber 78 must pass through the respective orifices 146, 154 to enter the sub-chamber 138 and the fuel bleed inlets 62. The orifices 146, 154 may be calibrated to meter different amounts of gaseous fuel into the sub-chamber 138 (e.g., by having different diameters). Further, each of the orifices 146, 154 includes a diameter, and therefore a cross-sectional area, less than that of the orifices 92 defined by the jets 86, 90. In the illustrated construction of the idle jet housing 130, each of the orifices 146, 154 is defined by a respective jet 162, 166 coupled to the idle jet housing 130. Specifically, each of the jets 162, 166 is a separate and distinct component from the idle jet housing 130, and is threadably connected to the idle jet housing 130. Alternatively, the jets 162, 166 may be omitted, and each of the orifices 146, 154 may be defined by respective apertures created in the idle jet housing 130.

Figure 7:
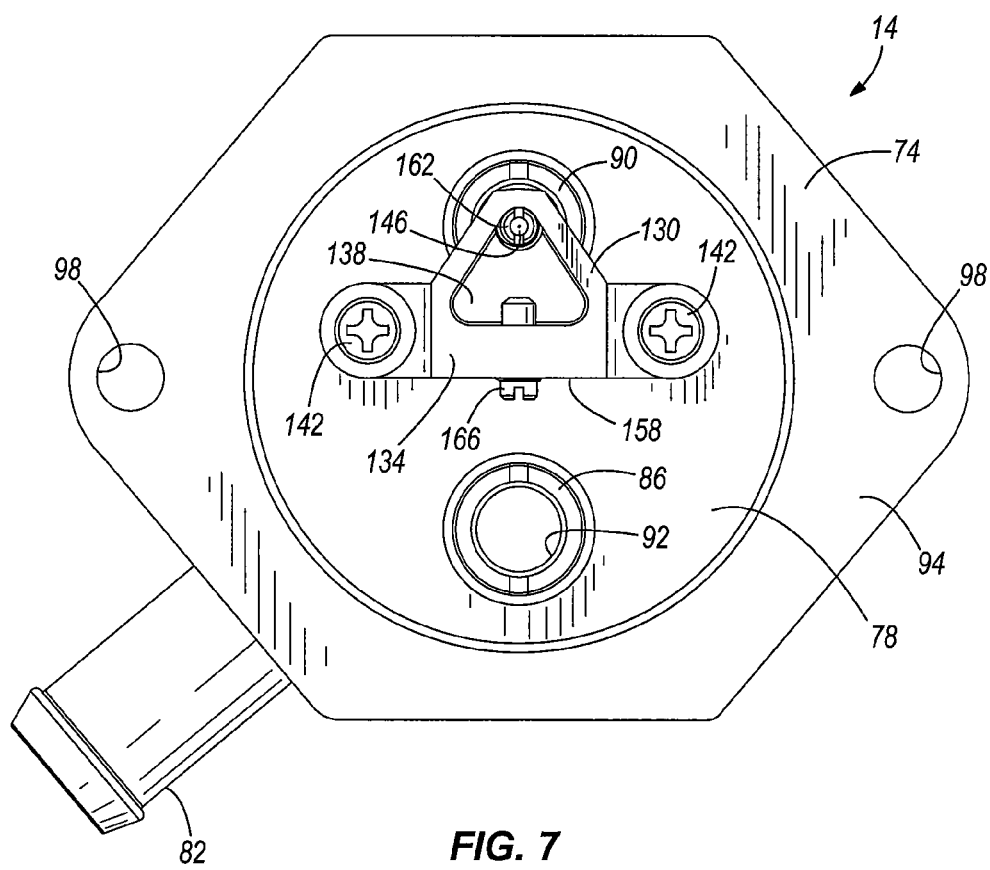
FIG. 7 is a top view of the intake unit of the gaseous fuel mixing device of FIG. 1.

With reference to FIGS. 7 and 9, the jet 162 is substantially coaxial with the jet 90 in the intake unit 18. In operation of the intake unit 18, as will be discussed in greater detail below, a tip 170 of the plunger 118 is engageable with the jet 162 to substantially close the jet 162 at about the same time that the jet 90 is closed by the valve 106 (see FIGS. 14 and 15). The plunger tip 170 may include any of a number of different shapes (e.g., a tapered shape) to facilitate sealing the plunger tip 170 against the jet 162 to substantially prevent flow of gaseous fuel through the jet 162 and into the sub-chamber 138.

Figure 12:
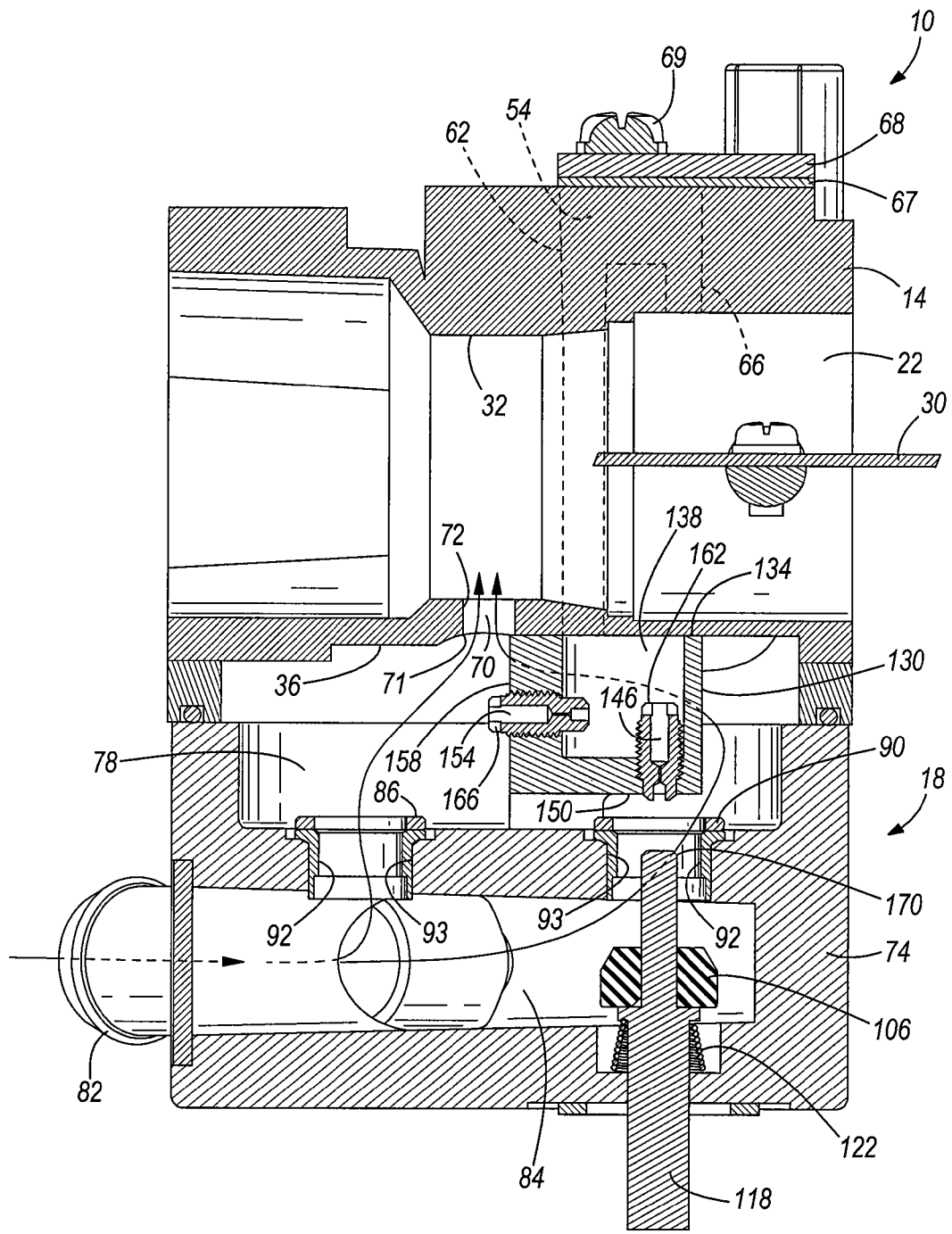
FIG. 12 is a cross-sectional view of the gaseous fuel mixing device of FIG. 1, along line 12-12 in FIG. 4, illustrating the mixing device operating in the first condition with the first type of fuel.
Figure 14:
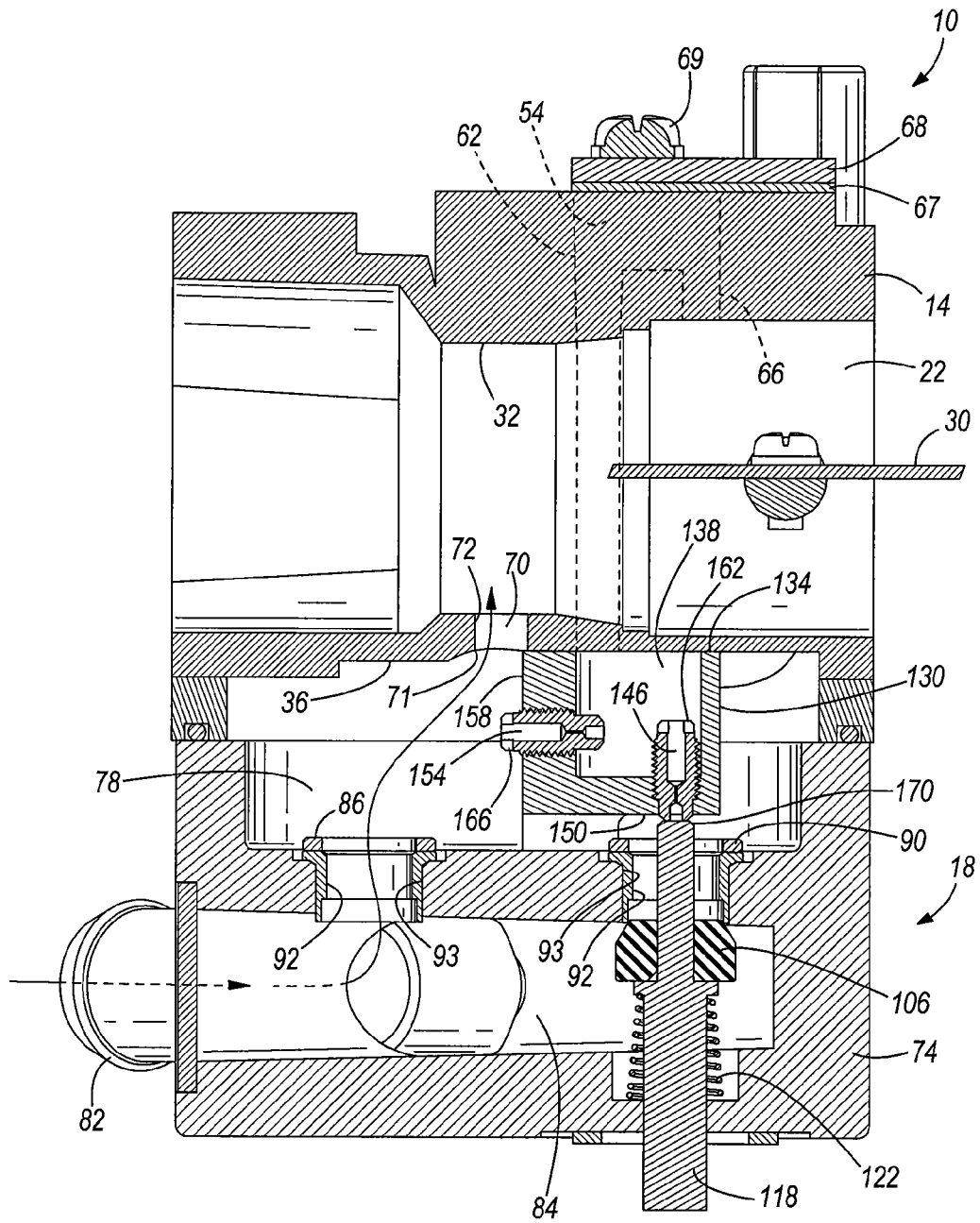
FIG. 14 is a cross-sectional view of the gaseous fuel mixing device of FIG. 1, along the same line 12-12 in FIG. 4, illustrating the mixing device operating in the first condition with the second type of fuel.
Figure 15:
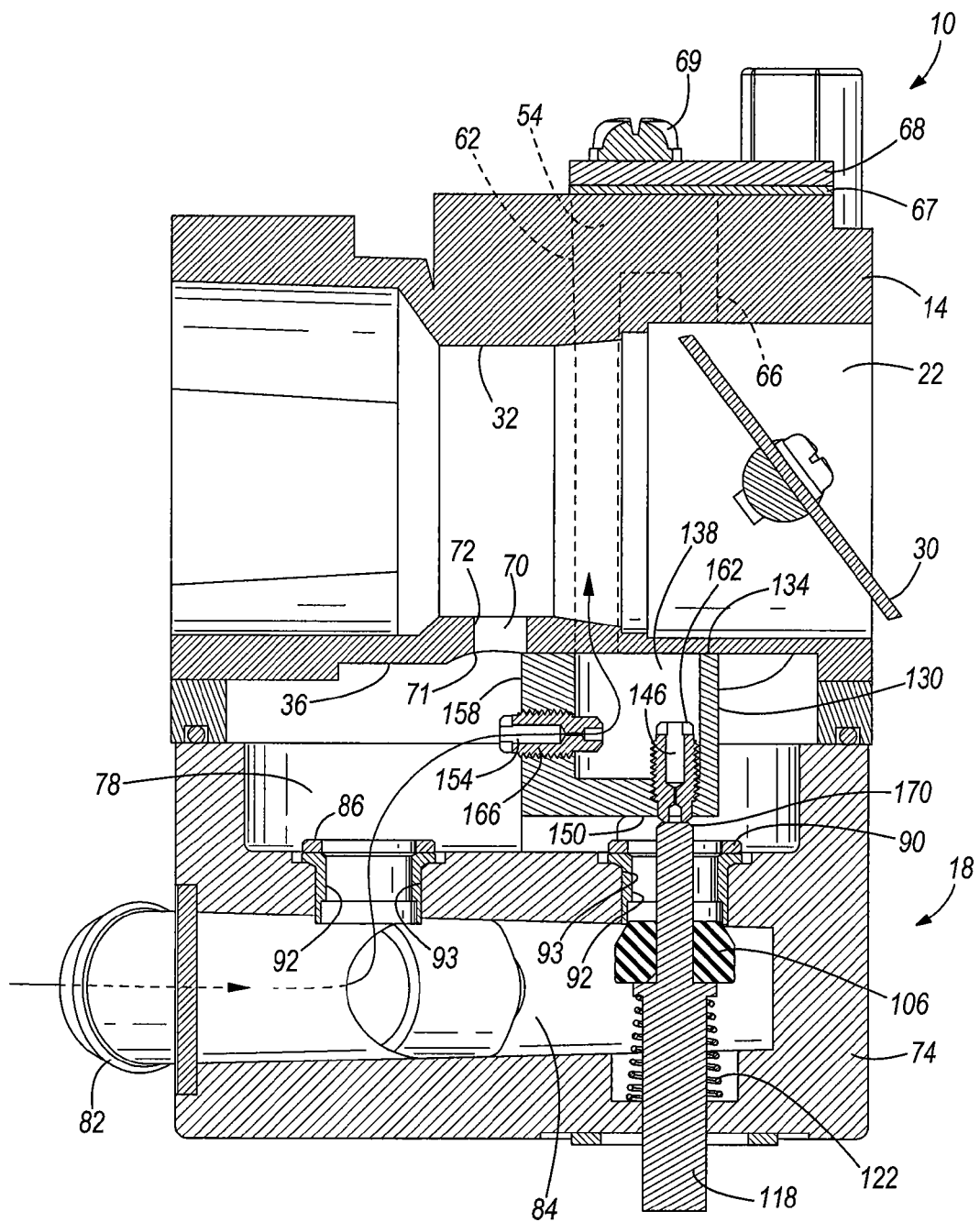
FIG. 15 is a cross-sectional view of the gaseous fuel mixing device of FIG. 1, along the same line 12-12 in FIG. 4, illustrating the mixing device operating in the second condition with the second type of fuel.

In operation of the engine 12, a user rotates the throttle valves 30 relative to the intake passageways 22, 26 (e.g., by pushing a pedal, pulling a lever, etc.), or the engine governor automatically positions the throttle valves 30 to adjust the air flow through the intake passageways 22, 26. When the throttle valves 30 are substantially parallel to the direction of air flow in the intake passageways 22, 26 (as shown in FIGS. 12 and 14), the greatest amount of air flows through the intake passageways 22, 26. As the air flows through the intake passageways 22, 26, the flow is slightly reduced at the venturis 32. At normal operating speeds, this creates a vacuum pulse that is capable of drawing gaseous fuel from the intake unit 18 into the intake passageways 22, 26 via the respective passageways or apertures 70. The gaseous fuel mixes and flows with the air toward the first and second cylinders of the engine 12 where it is combusted to power the engine 12.

Figure 8:
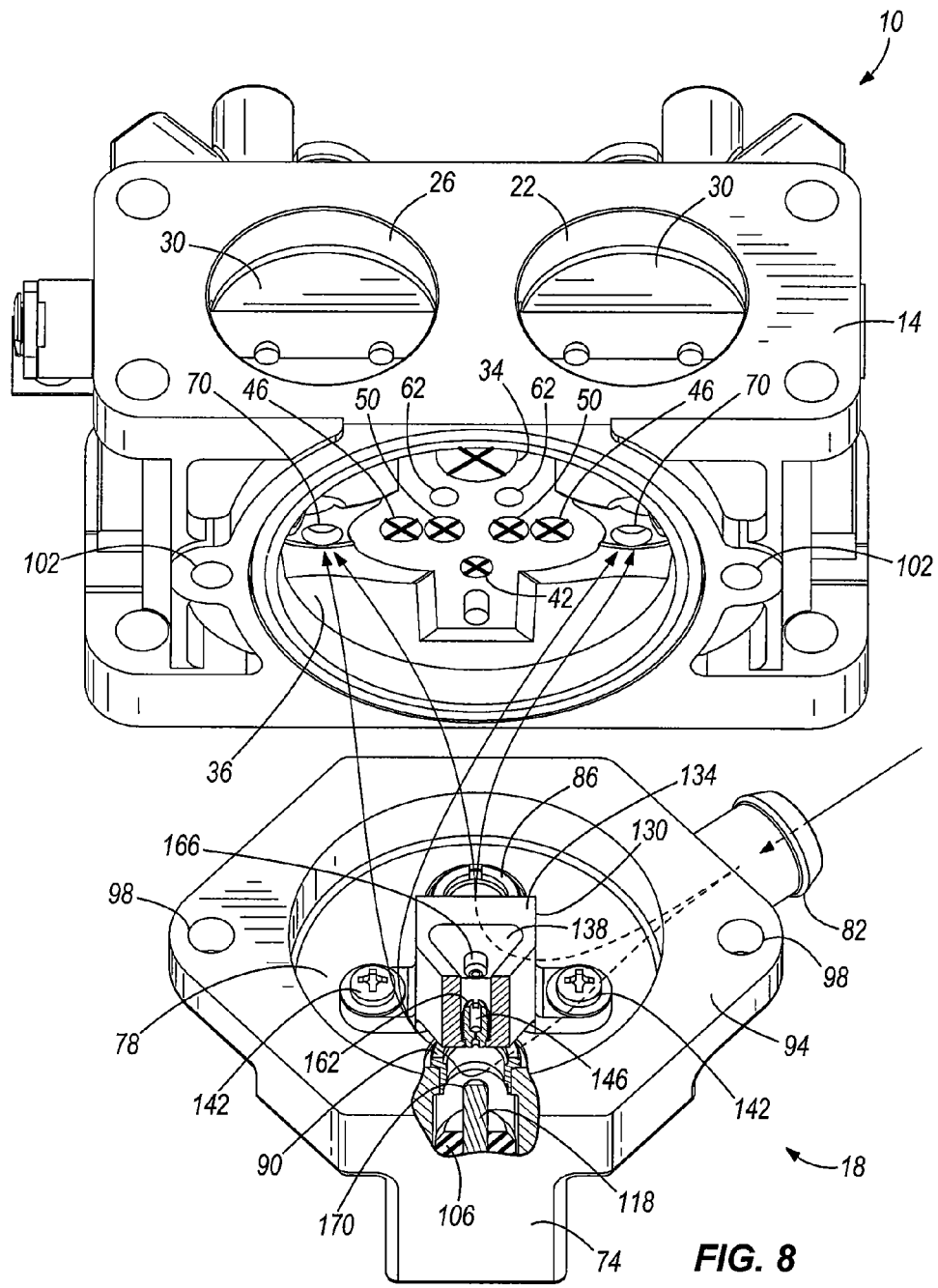
FIG. 8 is a perspective view illustrating the modified carburetor body separated from the intake unit of FIG. 1, illustrating the mixing device operating in a first condition with a first type of fuel.

FIGS. 8 and 12 illustrate the mixing device 10 operating in a main or normal running circuit. The main circuit is used when the engine 12 is in a normal operating condition (e.g., full throttle), and not simply running at an idle speed. The mixing device 10 operates according to this main circuit when the vacuum pulses in the modified carburetor body 14 are sufficiently strong to draw gaseous fuel through the apertures 70 in fluid flow communication with the fuel chamber 78.

While operating according to the main circuit, gaseous fuel flows through the hose connection 82, through the first and/or second jets 86, 90, and into the fuel chamber 78 of the intake unit 18. The gaseous fuel in the fuel chamber 78 is drawn through the large apertures 70 and into the corresponding intake passageways 22, 26 (see FIG. 12). From the intake passageways 22, 26, the gaseous fuel flows to the respective cylinders of the engine 12 for combustion, based upon the magnitude of the respective individual vacuum pulses generated by each cylinder during the intake stroke of the engine. If the individual vacuum pulses in the intake passageways 22, 26 differ, different amounts of gaseous fuel are drawn from the intake unit 18 into the respective passageways 22, 26 to suit the individual fuel demand for each of the cylinders in the engine 12. In the illustrated embodiment, the valve 106 is open such that the gaseous fuel flows through both jets 86, 90. Such a configuration is desirable for NG applications. In other embodiments, the valve 106 may be closed such that the gaseous fuel can only flow through the first jet 86 (see FIG.

14). Such a configuration is desirable for LP applications. For single fuel applications, the valve 106 may be omitted.

FIGS. 9 and 13 illustrate the mixing device 10 operating in an idle or slow circuit, in which the throttle valves 30 are substantially closed. The idle circuit is used when the vacuum pulses in the modified carburetor body 14 and mixing device 10 are not strong enough to draw gaseous fuel through the apertures 70, but instead draw the gaseous fuel through the fuel bleed inlets 62. While the engine 12 is using the idle circuit at idle speed, the individual vacuum pulses in the mixing device 10 draw the gaseous fuel through the smaller fuel bleed inlets 62 in a sufficient quantity to keep the engine 12 running at an idle speed. When the idle circuit is in use, the gaseous fuel in the fuel passageway 78 flows through the jets 162, 166, into the sub-chamber 138, through the fuel bleed inlets 62, through the mixing chambers 54 and idle holes 66, and into the intake passageways 22, 26 (see FIG. 13). In the illustrated embodiment, the solenoid 114 is energized to maintain the valve 106 in a position spaced from the jet 90 such that both jets 86, 90 supply gaseous fuel to the fuel chamber 78, which, as discussed above, is desirable for NG applications. In other embodiments, the solenoid 114 may be de-energized to allow the valve 106 to seat against and close the jet 90, and allow the plunger tip 170 to seat against and close the jet 162 in the idle jet housing 130, such that the gaseous fuel only flows through the first jet 86 and the jet 166 in the idle jet housing 130, which is desirable for LP applications (see FIG. 15). For single fuel applications, the valve 106 may be omitted.

The mixing device 10 provides a low-cost structure and method to modify an existing carburetor body for use with a gaseous fuel. More particularly, unneeded passageways in the existing carburetor body may be quickly, inexpensively, and easily blocked without requiring a new mixing device body to be designed and tooled from scratch. In addition, the existing carburetor body may be fitted with a low-cost, easy to manufacture intake unit to further minimize costs. Gaseous fuel engines may, thereby, become more available while minimizing additional costs that are generated when manufacturing specialized components.

An important aspect of the present invention is that the individual vacuum pulse of each individual cylinder determines or regulates the amount of fuel drawn in by that cylinder without the need for a separate regulator or injector, and without an electronic controller. Each cylinder draws in an individualized quantity of fuel during its own intake stroke.

Various features of the invention are set forth in the following claims.

What is claimed is:

1. A gaseous fuel mixing device configured for use with an internal combustion engine, the mixing device comprising:
  a body including an air/fuel passageway, and a gaseous fuel passageway in fluid communication with the air/fuel passageway;
  a throttle valve pivotably coupled to the body and positioned in the air/fuel passageway;
  an intake unit coupled to the body, the intake unit including
    an inlet configured to be fluidly connected with a source of gaseous fuel;
    a first jet fluidly communicating the inlet and the gaseous fuel passageway;
    a second jet selectively fluidly communicating the inlet and the gaseous fuel passageway; and
    a selector valve operable to control a flow of gaseous fuel through the second jet.

2. The gaseous fuel mixing device of claim 1, wherein the intake unit includes a gaseous fuel chamber in fluid communication with the gaseous fuel passageway, wherein the first jet is configured to transfer gaseous fuel from the inlet to the gaseous fuel chamber, and wherein the second jet is configured to transfer gaseous fuel, upon actuation of the selector valve, from the inlet to the gaseous fuel chamber.

3. The gaseous fuel mixing device of claim 2, further comprising an idle jet housing at least partially positioned within the gaseous fuel chamber, wherein the idle jet housing includes a second gaseous fuel chamber in fluid communication with the gaseous fuel passageway, and at least one orifice selectively fluidly communicating the first gaseous fuel chamber in the intake unit with the second gaseous fuel chamber.

4. The gaseous fuel mixing device of claim 3, wherein the selector valve is configured to control the flow of gaseous fuel through the second jet and the orifice in the idle jet housing.

5. The gaseous fuel mixing device of claim 3, wherein the body includes a second gaseous fuel passageway in fluid communication with the air/fuel passageway, and wherein the second gaseous fuel passageway directly fluidly connects the first gaseous fuel chamber in the intake unit with the air/fuel passageway.

6. The gaseous fuel mixing device of claim 5, wherein the second gaseous fuel passageway is configured to receive gaseous fuel from at least one of the first and second jets when the throttle valve is substantially open.

7. The gaseous fuel mixing device of claim 5, wherein the first gaseous fuel passageway is configured to receive gaseous fuel from at least one of the first and second jets, via the orifice in the idle jet housing, when the throttle valve is substantially closed.

8. The gaseous fuel mixing device of claim 3, wherein the orifice has a cross-sectional area less than a cross-sectional area of the first jet, and wherein the cross-sectional area of the orifice is less than a cross-sectional area of the second jet.

9. The gaseous fuel mixing device of claim 1, wherein the selector valve is configured to be moved between a first position, in which the second jet is at least partially closed, and a second position, in which the second jet is substantially open.

10. The gaseous fuel mixing device of claim 1, wherein the body includes a second air/fuel passageway and a second gaseous fuel passageway in fluid communication with the second air/fuel passageway, and wherein each of the first and second gaseous fuel passageways is configured to draw an amount of gaseous fuel, based upon individual demand of fuel through the respective first and second air/fuel passageways, from the intake unit.

11. The gaseous fuel mixing device of claim 1, wherein the body includes a modified carburetor body originally configured for use with a liquid fuel, wherein the gaseous fuel passageway has an inlet in communication with an exterior of the body and an outlet in communication with the air/fuel passageway, and wherein the body includes a closed liquid fuel passageway.

12. A gaseous fuel mixing device configured for use with an internal combustion engine, the mixing device comprising:
  a body including
    a first air/fuel passageway;
    a second air/fuel passageway;
    a first gaseous fuel passageway in fluid communication with the first air/fuel passageway;
    a second gaseous fuel passageway in fluid communication with the second air/fuel passageway;
  a first throttle valve pivotably coupled to the body and positioned in the first air/fuel passageway;

a second throttle valve pivotably coupled to the body and positioned in the second air/fuel passageway; and an intake unit coupled to the body and in fluid communication with a source of gaseous fuel, wherein each of the first and second gaseous fuel passageways is configured to draw an amount of gaseous fuel, based upon individual demand of fuel through the respective first and second air/fuel passageways, from the intake unit.

13. The gaseous fuel mixing device of claim 12, wherein the intake unit includes an inlet configured to be fluidly connected with the source of gaseous fuel;

a first jet fluidly communicating the inlet with the first and second gaseous fuel passageways;

a second jet selectively fluidly communicating the inlet with the first and second gaseous fuel passageways; and a selector valve configured to control a flow of gaseous fuel through the second jet.

14. The gaseous fuel mixing device of claim 13, wherein the intake unit includes a gaseous fuel chamber in fluid communication with the first and second gaseous fuel passageways, wherein the first jet is configured to transfer gaseous fuel from the inlet to the gaseous fuel chamber, and wherein the second jet is configured to transfer gaseous fuel, upon actuation of the selector valve, from the inlet to the gaseous fuel chamber.

15. The gaseous fuel mixing device of claim 14, further comprising an idle jet housing at least partially positioned within the gaseous fuel chamber, wherein the idle jet housing includes a second gaseous fuel chamber in fluid communication with the first and second gaseous fuel passageways, and at least one orifice selectively fluidly communicating the first gaseous fuel chamber in the intake unit with the second gaseous fuel chamber.

16. The gaseous fuel mixing device of claim 15, wherein the selector valve is configured to control the flow of gaseous fuel through the second jet and the orifice in the idle jet housing.

17. The gaseous fuel mixing device of claim 15, wherein the body includes a third gaseous fuel passageway in fluid communication with the first air/fuel passageway; and a fourth gaseous fuel passageway in fluid communication with the second air/fuel passageway, wherein the third gaseous fuel passageway directly fluidly connects the first gaseous fuel chamber in the intake unit with the first air/fuel passageway, and wherein the fourth gaseous fuel passageway directly fluidly connects the first gaseous fuel chamber in the intake unit with the second air/fuel passageway .

18. The gaseous fuel mixing device of claim 17, wherein the third and fourth gaseous fuel passageways are each configured to draw gaseous fuel from at least one of the first and second jets when the throttle valve is substantially open.

19. The gaseous fuel mixing device of claim 17, wherein the first and second gaseous fuel passageways are each configured to draw gaseous fuel from at least one of the first and second jets, via the orifice in the idle jet housing, when the throttle valve is substantially closed.

20. The gaseous fuel mixing device of claim 15, wherein the orifice has a cross-sectional area less than a cross-sectional area of the first jet, and wherein the cross-sectional area of the orifice is less than a cross-sectional area of the second jet.

21. The gaseous fuel mixing device of claim 13, wherein the selector valve is configured to be moved between a first position, in which the second jet is at least partially closed, and a second position, in which the second jet is substantially open.

22. The gaseous fuel mixing device of claim 12, wherein the body includes a modified carburetor body originally configured for use with a liquid fuel, wherein each of the first and second gaseous fuel passageways has an inlet in communication with an exterior of the body, and wherein the body includes a closed liquid fuel passageway.

23. A gaseous fuel mixing device configured for use with an internal combustion engine, the mixing device comprising:

a modified carburetor body, originally configured for use with a liquid fuel, including an air/fuel passageway;

a gaseous fuel passageway having an inlet in communication with an exterior of the body and an outlet in communication with the air/fuel passageway;

a closed liquid fuel passageway;

a throttle valve pivotably coupled to the carburetor body and positioned in the air/fuel passageway; and an intake unit coupled to the carburetor body, the intake unit configured to deliver gaseous fuel to the gaseous fuel passageway in the carburetor body.

24. The gaseous fuel mixing device of claim 23, wherein the intake unit includes an inlet configured to be fluidly connected with a source of gaseous fuel;

a first jet fluidly communicating the inlet with the gaseous fuel passageway;

a second jet selectively fluidly communicating the inlet with the gaseous fuel passageway; and a selector valve operable to control a flow of gaseous fuel through the second jet.

25. The gaseous fuel mixing device of claim 24, wherein the intake unit includes a gaseous fuel chamber in fluid communication with the gaseous fuel passageway, wherein the first jet is configured to transfer gaseous fuel from the inlet to the gaseous fuel chamber, and wherein the second jet is configured to transfer gaseous fuel, upon actuation of the selector valve, from the inlet to the gaseous fuel chamber.

26. The gaseous fuel mixing device of claim 25, further comprising an idle jet housing at least partially positioned within the gaseous fuel chamber, wherein the idle jet housing includes a second gaseous fuel chamber in fluid communication with the gaseous fuel passageway, and at least one orifice selectively fluidly communicating the first gaseous fuel chamber in the intake unit with the second gaseous fuel chamber.

27. The gaseous fuel mixing device of claim 26, wherein the selector valve is configured to control the flow of gaseous fuel through the second jet and the orifice in the idle jet housing.

28. The gaseous fuel mixing device of claim 25, wherein the body includes a second gaseous fuel passageway in fluid communication with the air/fuel passageway, and wherein the second gaseous fuel passageway directly fluidly connects the first gaseous fuel chamber in the intake unit with the air/fuel passageway.

29. The gaseous fuel mixing device of claim 28, wherein the second gaseous fuel passageway is configured to draw gaseous fuel from at least one of the first and second jets when the throttle valve is substantially open.

30. The gaseous fuel mixing device of claim 26, wherein the first gaseous fuel passageway is configured to draw gaseous fuel from at least one of the first and second jets, via the orifice in the idle jet housing, when the throttle valve is substantially closed.

31. The gaseous fuel mixing device of claim 26, wherein the orifice has a cross-sectional area less than a cross-sectional area of the first jet, and wherein the cross-sectional area of the orifice is less than a cross-sectional area of the second jet.

32. The gaseous fuel mixing device of claim 24, wherein the selector valve is configured to be moved between a first position, in which the second jet is at least partially closed, and a second position, in which the second jet is substantially open.

33. The gaseous fuel mixing device of claim 23, wherein the body includes a second air/fuel passageway and a second gaseous fuel passageway in fluid communication with the second air/fuel passageway, and wherein each of the first and second gaseous fuel passageways is configured to draw an amount of gaseous fuel, based upon individual demand of fuel through the respective first and second air/fuel passageways, from the intake unit.

* * * * *